(12) United States Patent
Ueda et al.

(10) Patent No.: US 7,093,465 B2
(45) Date of Patent: *Aug. 22, 2006

(54) METHOD FOR HEAT TREATING SYNTHETIC QUARTZ GLASS FOR OPTICAL USE

(75) Inventors: Tetsuji Ueda, Koriyama (JP); Hiroyuki Nishimura, Koriyama (JP); Akira Fujinoki, Koriyama (JP)

(73) Assignees: Heraeus Quarzglas GmbH & Co. KG, Hanau (DE); Shin-Etsu quartz Products Co., Ltd., Tokyo (JP)

( * ) Notice: Subject to any disclaimer, the term of this patent is extended or adjusted under 35 U.S.C. 154(b) by 468 days.

This patent is subject to a terminal disclaimer.

(21) Appl. No.: 10/297,451

(22) PCT Filed: May 31, 2001

(86) PCT No.: PCT/EP01/06179

§ 371 (c)(1),
(2), (4) Date: Dec. 6, 2002

(87) PCT Pub. No.: WO01/94267

PCT Pub. Date: Dec. 13, 2001

(65) Prior Publication Data

US 2003/0131631 A1 Jul. 17, 2003

(30) Foreign Application Priority Data

Jun. 6, 2000 (JP) .............................. 2000-168982

(51) Int. Cl.
*C03C 15/00* (2006.01)
(52) U.S. Cl. .................. 65/30.1; 65/111; 65/426; 65/900
(58) Field of Classification Search .................. 65/17.2, 65/17.3, 30.1, 111, 424, 426, 900, DIG. 8; 359/350, 355
See application file for complete search history.

(56) References Cited

U.S. PATENT DOCUMENTS 6,578,382 B1 * 6/2003 Ueda et al. .................. 65/30.1

FOREIGN PATENT DOCUMENTS

EP 0 921 104 A 6/1999

(Continued)

OTHER PUBLICATIONS

Patent Abstract of Japan vol. 1996, No. 68, Aug. 30, 1996 & JP 08 091857 A TOSOH Corp, Apr. 9, 1996 abstract.

(Continued)

*Primary Examiner*—Carlos Lopez
(74) *Attorney, Agent, or Firm*—Tiajoloff & Kelly (57) ABSTRACT

An object of the present invention is to overcome the problems of the prior art technique, and to provide a heat treatment method as well as a heat treatment apparatus capable of heat treating, with higher efficiency, a synthetic quartz glass for optical use having higher homogeneity and higher purity. Another object of the present invention is to provide and a synthetic quartz glass for optical use.

The problems above are solved by, in a method for heat treating a flat cylindrical synthetic quartz glass body provided as the object to be heat treated in a heating furnace, a method for heat treating a synthetic quartz glass for optical use comprising preparing a vessel made of quartz glass and having a flat cylindrical space for setting therein the object synthetic quartz glass body, placing two or more object synthetic quartz glass bodies into the vessel in parallel with each other, filling the space with $SiO_2$ powder, setting the vessel inside the heating furnace with its lid closed, and applying the heat treatment to the vessel.

11 Claims, 5 Drawing Sheets

FOREIGN PATENT DOCUMENTS

| | | |
|---|---|---|
| JP | 62-100436 | 5/1987 |
| JP | 63-218522 | 9/1988 |
| JP | 8-81225 | 3/1996 |
| JP | 8-91857 | 4/1996 |
| JP | 10-279322 | 10/1998 |
| WO | WO 9716382 A * | 9/1997 |

OTHER PUBLICATIONS

Patent Abstracts of Japan vol. 1999, No. 1, Jan. 29, 1999 & JP 10 279322 A (Nikon Corp), Oct. 20,1998 abstract.

Patent Abstracts of Japan vol. 11, No. 315 (C-451), Oct. 14, 1987 & JP 62 100436 A (Asahi Glass Co LTD), May 9,1987 abstract.

Patent Abstracts of Japan vol. 1996, No. 7, Jul. 31, 1996 & JP 08 081225 A (Sumitomo Metal Ind LTD), Mar. 26, 1996 abstract.

Patent Abstracts of Japan for JP 63-218522 published Sep. 12, 1988.

Patent Abstracts of Japan for JP 8-91857 published Apr. 9, 1996.

Patent Abstracts of Japan for JP 10-279322 published Oct. 20, 1998.

Patent Abstracts of Japan for JP 62-100436 published May 9, 1987.

Patent Abstracts of Japan for JP 8-81225 published Mar. 26, 1996.

* cited by examiner

|  | Example 1 | Example 2 | Example 3 | Comparative Example 1 | Comparative Example 2 |
|---|---|---|---|---|---|
| Distance between samples | 50mm | 120mm | 20mm | 50mm | 50mm |
| Position of sample | 78% | 87% | 78% | 78% | None |
| Na in powder | 20 | 20 | 50 | 20 | None |
| Comments | Best | 80% out | Na rich | No powder | Vessel |
| Before treatment $\Delta n (\times 10^{-6})$ | 4.2 | 3.8 | 5.5 | 6.8 | 7.2 |
|  | 5.3 | 6.2 | 5.4 | 4.9 | 3.7 |
|  | 5.5 | 4.4 |  | 5.1 | 4.8 |
| After treatment $\Delta n (\times 10^{-6})$ | 0.6 | 0.8 | 0.8 | 1.8 | 2.7 |
|  | 0.7 | 1.0 | 0.9 | 1.2 | 2.2 |
|  | 0.6 | 1.0 |  | 1.5 | 2.3 |
| Refractive index after treatment (nm/cm) | 0.20 | 0.35 | 0.45 | 0.61 | 1.50 |
|  | 0.23 | 0.42 | 0.31 | 0.99 | 1.32 |
|  | 0.30 | 0.40 |  | 0.72 | 1.84 |
| Transmittance after treatment % (at 193.4 nm) | 99.8 | 99.8 | 99.7 | 99.7 | 99.5 |
|  | 99.8 | 99.8 | 99.8 | 99.7 | 99.6 |
|  | 99.8 | 99.8 |  | 99.7 | 99.5 |
| Na after treatment (ppb) | 2 | 2 | 5 | 5 | 40 |
|  | 2 | 2 | 5 | 10 | 25 |
|  | 2 | 2 |  | 5 | 45 |

METHOD FOR HEAT TREATING SYNTHETIC QUARTZ GLASS FOR OPTICAL USE

TECHNICAL FIELD TO WHICH THE INVENTION BELONGS

The present invention relates to a highly homogeneous synthetic quartz glass having high optical transmittance and high resistance against laser radiations, which is suitable for use as an optical member to be employed in a lithographic apparatus equipped with an excimer laser. It also relates to a method for heat treating and to a heat treatment apparatus for said synthetic quartz glass.

PRIOR ART

The technology of photolithography, which comprises transferring a pattern provided on a photomask to a wafer by using a laser radiation, is widely used for aligners for producing semiconductor integrated circuits, because of its superiority on production cost over other techniques utilizing electron beams and X rays.

Recently, with an increase in miniaturization and in the degree of integration of LSIs, light sources with shorter wavelengths are used for the exposure, and aligners employing an i-line (having a wavelength of 365 nm) capable of forming patterns with a line width of from 0.4 to 0.5 μm or a KrF excimer laser radiation (having a wavelength of 248.3 nm) capable of forming patterns with a line width of from 0.25 to 0.35 μm have been used in practice. More recently, the development of an aligner equipped with an ArF excimer laser (having a wavelength of 193.4 nm) capable of forming patterns with a line width of from 0.13 to 0.2 μm is progressing for its practical use. Thus, in an optical member for use in the lithographic apparatus equipped with an ArF excimer laser, it is required that it more satisfies the requirements such as homogeneity, transmittance, resistance against laser radiations, etc., at an ever higher level.

As a material capable of satisfying the above requirements for an optical member, a high purity synthetic quartz glass has been utilized, and improvements in the optical transmittance and the resistance against laser radiations have been made on those materials by optimizing the conditions of production. At the same time, further improvement in optical characteristics such as homogeneity and birefringence is being attempted. Among them, in order to achieve an improvement in homogeneity and a reduction of birefringence, it is known that a heat treatment accompanying gradual cooling (annealing treatment) for the strain removal of quartz glass should be incorporated during the production process of an optical member. As such a heat treatment, generally known is to keep the optical member at a high temperature inside the heating furnace for a long duration of time.

However, on lowering the temperature in the annealing treatment above, a difference in temperature distribution was found to generate between the central portion and the outer peripheral portion of the object to be treated, and this temperature distribution was found to remain as a difference in density even after the annealing treatment. Hence, the improvements on the distribution of refractive indices and on birefringence were found still insufficient.

Accordingly, in order to further improve the distribution of refractive indices and the birefringence of quartz glass, there had been proposed a method comprising performing the annealing by placing the object to be treated inside a ring or a vessel, or buried in a powder, thereby controlling the temperature distribution by retarding the rate of lowering the temperature on the outer peripheral side of the object. In case of employing such methods, preferred is to use a vessel having a shape as such that is thicker for the outer peripheral direction, so as to suppress the temperature distribution in the object, particularly, the temperature difference between the outer peripheral portion and the central portion, from occurring during lowering the temperature.

However, in case this method is employed, the number of the objects to be set inside the heating furnace becomes extremely limited as compared to the case not using a vessel; hence, this led to a poor production efficiency due to the decrease in the number of objects treated at a single heat treatment.

PROBLEMS THE INVENTION IS TO SOLVE

The present invention has been made in the light of the aforementioned problems, and an object of the present invention is to provide a heat treatment method and a heat treatment apparatus capable of heat treating, with higher efficiency, a synthetic quartz glass for optical use having higher homogeneity and higher purity. It also is an object of the present invention to provide a synthetic quartz glass for optical use.

MEANS FOR SOLVING THE PROBLEMS

The objects of the present invention described above can be achieved by the constitutions (1) to (11) below according to the present invention.

(1) In a method for heat treating a flat cylindrical synthetic quartz glass body provided as the object to be heat treated in a heating furnace, a method for heat treating a synthetic quartz glass for optical use comprising preparing a vessel made of quartz glass and having a flat cylindrical space for setting therein the object synthetic quartz glass body, placing two or more object synthetic quartz glass bodies into the vessel in parallel with each other, filling the space with $SiO_2$ powder, setting the vessel inside the heating furnace with its lid closed, and applying the heat treatment to the vessel.

(2) A method for heat treating a synthetic quartz glass for optical use as described above in constitution (1), wherein, in case two or more of the object synthetic quartz glass bodies have the same diameter, the diameter of the space for placing the objects is provided 2.1 times or more of the diameter of the synthetic quartz glass body.

(3) A method for heat treating a synthetic quartz glass for optical use as described above in constitution (1) or (2), wherein the place for placing the object synthetic quartz glass bodies inside the vessel is provided within 80% of the outer diameter of the vessel.

(4) A method for heat treating a synthetic quartz glass for optical use as described in one of constitution (1) to (3) above, wherein said $SiO_2$ powder is a synthetic $SiO_2$ powder containing 30 ppb or less of Na.

(5) A method for heat treating a synthetic quartz glass for optical use as described in one of constitution (1) to (4) above, wherein said $SiO_2$ powder is a $SiO_2$ powder having a hydrogen molecule density of $1.0 \times 10^{19}$ molecules/cm$^2$ or higher.

(6) A method for heat treating a synthetic quartz glass for optical use as described in one of constitution (1) to (5) above, wherein said $SiO_2$ powder contains 95% by weight or more of particles having a particle diameter of 1,000 μm or smaller.

(7) A synthetic quartz glass for optical use prepared by methods as described in one of constitution (1) to (6) above, having a fluctuation in refractive index Δn of $1.0 \times 10^{-6}$ or less, a birefringence of 0.5 nm/cm or lower, and an initial transmittance for a light 193.4 nm in wavelength of 99.7% or higher.

(8) In an apparatus for heat treating a flat cylindrical synthetic quartz glass body provided as the object to be heat treated in a heating furnace, an apparatus for heat treating a synthetic quartz glass for optical use comprising a vessel made of quartz glass and provided with a flat cylindrical space for setting therein the object synthetic quartz glass body, and $SiO_2$ powder filled so as to cover two or more object synthetic quartz glass bodies set inside the vessel in parallel with each other.

(9) An apparatus for heat treating a synthetic quartz glass for optical use as described in constitution (8) above, wherein, in case two or more of the object synthetic quartz glass bodies have the same diameter, the diameter of the space for placing the objects is provided 2.1 times or more of the diameter of the synthetic quartz glass body.

(10) An apparatus for heat treating a synthetic quartz glass for optical use as described in constitution (8) or (9) above, wherein, said $SiO_2$ powder is a synthetic $SiO_2$ powder containing 30 ppb or less of Na.

(11) An apparatus for heat treating a synthetic quartz glass for optical use as described in one of constitution (8) to (10) above, wherein said $SiO_2$ powder contains 95% by weight or more of particles having a particle diameter of 1,000 μm or smaller.

MODE OF CARRYING OUT THE INVENTION

The heat treatment apparatus for synthetic quartz glass for optical use according to the present invention is equipped with a heating furnace for heat treating the object to be treated, i.e., a synthetic quartz glass body. Since a heating furnace conventionally used in the art can be used as it is, further explanation therefor is omitted. Furthermore, the heat treatment apparatus for synthetic quartz glass for optical use according to the present invention is equipped with a lidded vessel made of a quartz glass, which is placed inside the heat furnace with two or more of the synthetic quartz glass bodies being enclosed therein at the heat treatment.

Figure 1A:
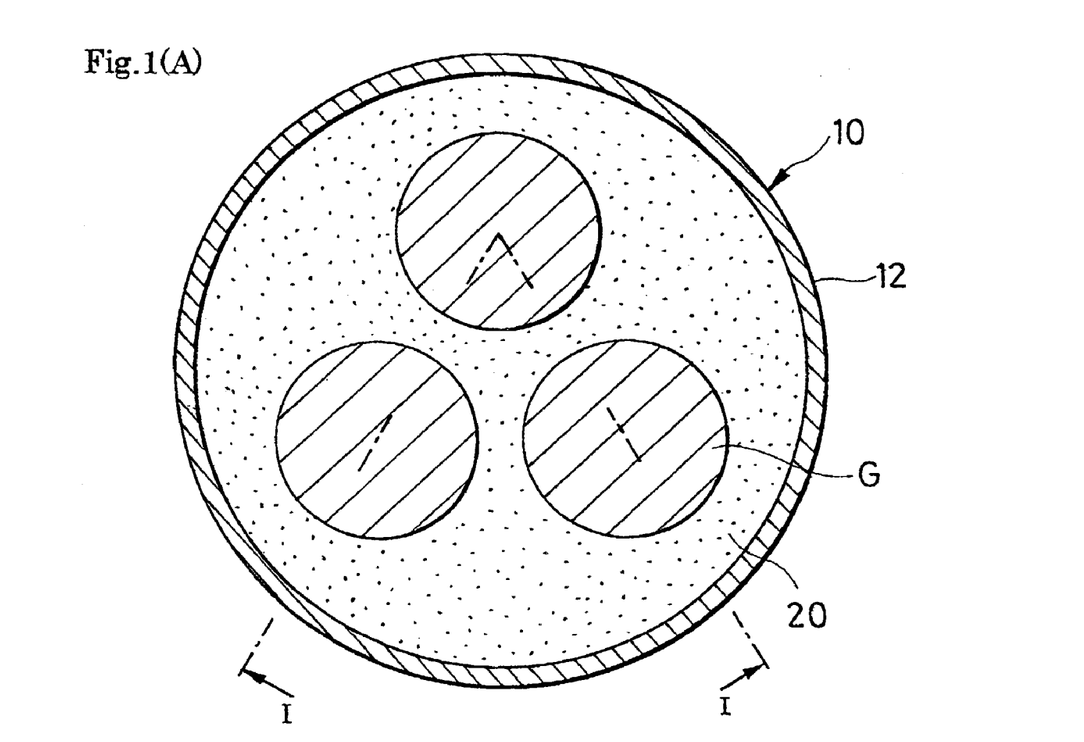
FIG. 1(A) shows the planar section view.
Figure 1B:
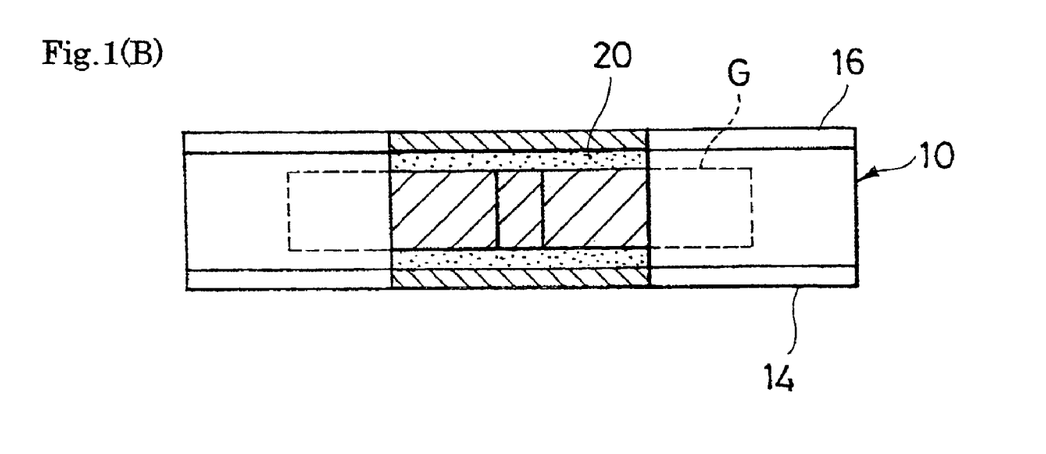
FIG. 1(B) shows the cross section view taken along line I—I of FIG. 1(A).

As shown in FIG. 1, the lidded vessel 10 is provided with a flat cylindrical space 10a having a diameter of at least two times of the diameter of the flat cylindrical synthetic quartz glass body G (in case the two or more synthetic quartz glass bodies G have the same diameter), which is the object enclosed therein to be subjected to the treatment, and has a surrounding side wall 12, a disk-shaped bottom plate 14, and a disk-shaped lid 16. The surrounding side wall 12 and the bottom plate 14 may be provided either separately or integrated monolithically.

The diameter of the space 10a above is preferably 2.1 times or more of the diameter of the synthetic quartz glass body G that is the object to be treated therein. The volume of the lidded vessel 10 is preferably 1.8 times or more, and particularly preferably, about 2 to 10 times as large as that of the synthetic quartz glass that is the object to be treated therein.

Since the synthetic quartz glass body G, i.e., the object to be treated, is 70 to 400 mm in diameter and about 5 to 150 mm in thickness, preferably, the space of the lidded vessel 10 is practically about 150 to 1500 mm in diameter, about 10 to 200 mm in height, and about 200 to 300,000 cm$^3$ in volume. Furthermore, the space of the vessel 10 preferably has a diameter to height ratio of 1.8 or more, and particularly preferably, 2 or more. Although there is no upper limit for the ratio, it is believed to be about 10.

As shown in FIG. 1, two or more of synthetic quartz glass bodies G, which are the object to be treated, are placed inside the space 10a of the vessel 10 in parallel with each other (that is, they are placed on the same plane), and, in this case, the position (denoted as a sample position in the Examples below) of the synthetic quartz glass bodies G that are the object to be treated is preferably within 80% of the outer diameter of the vessel 10.

Furthermore, the vessel 10 above preferably contains Na at a concentration of 100 ppb or less, particularly preferably 40 ppb or less, and further preferably, 5 ppb or less. Although the amount of Na that reaches the synthetic quartz glass body G is limited because Na discharged from the vessel, etc., is mostly trapped by the $SiO_2$ powder described hereinafter, the Na content of the vessel 10 above is preferably limited in the range above.

Further, the heat treatment apparatus according to the present invention is equipped with $SiO_2$ powder 20 (see FIG. 1) that is filled in the vessel 10 above in such a manner that it covers the surroundings of the synthetic quartz glass body G that is the object to be treated. As the $SiO_2$ powder, there can be used a $SiO_2$ powder previously subjected to a high pressure hydrogen treatment and thereby doped with hydrogen. In this case, the concentration of hydrogen molecules that are incorporated in the object to he treated can be maintained higher. The density of the hydrogen molecules dissolved in the hydrogen-doped $SiO_2$ powder is preferably $1 \times 10^{19}$ molecules/cm$^3$ or higher in average. The density of the dissolved hydrogen molecules may be the average taken over the entire $SiO_2$ powder, and hence, the powder thus doped with hydrogen may be used mixed with a powder not doped with hydrogen.

The Na content of the $SiO_2$ powder above is preferably 30 ppb or lower, and particularly preferably, 10 ppb or lower. The lower the content of Na, the better.

The $SiO_2$ powder above consists of particles in which 95% by weight or more thereof have a particle diameter in a range of 1,000 μm or smaller, preferably, in a range of from about 0.1 to 1,000 μm, and more preferably, in a range of from about 0.5 to 500 μm. If the range of the particles should have a particle size too large, there is fear that the powder fails to achieve the sufficiently high heat retentability due to a decrease in the packing density; hence, it is preferred that a powder containing particles exceeding 1,000 μm in particle diameter is not used. If the particle diameter should be too small, there occurs problems in handling; hence, it is practically desired not to use a powder having a particle diameter smaller than 0.1 μm. Further, in case of using a powder doped with hydrogen, it is preferred not use a powder containing particles having a particle diameter exceeding 1,000 μm in particle diameter because a particle too large in diameter there is fear of causing difficulty in dissolving sufficiently high amount of hydrogen molecules to a part of the powder in case of applying high pressure hydrogen treatment and the like. Also from this point of view, it is preferred that a powder having a particle diameter exceeding 1,000 μm in particle diameter is not used. Concerning the packing density above, a powder mixture consisting of powders differed in particle diameter may be used so long as the particle diameter fall within a range of 0.1 to 1,000 μm, and it is more preferred to use a powder having a wider range in particle diameter distribution, because such a powder often increases the packing properties.

However, the effect of the present invention can be achieved so long as the particle diameter of the SiO$_2$ powder used substantially fall within the range above. More specifically, there is no practical problem even if less than 5% of the entire weight of the SiO$_2$ powder above should fall outside of the particle size range defined above.

Further, by taking various conditions into consideration, it is particularly preferred that the SiO$_2$ powder above is a synthetic quartz glass powder. Since the synthetic quartz glass vessel and the SiO$_2$ powder above can be reused, it is economically advantageous to properly use them repeatedly depending on the size and the number of treatment.

The method for heat treating a synthetic quartz glass for optical use by performing a heat treatment in the heating furnace according to the present invention comprises using the apparatus described above, and, as shown in FIG. 1, performing the heat treatment by placing a plurality of the objects of treatment, i.e., the synthetic quartz glass bodies G, in parallel with each other inside the vessel 10, covering the surroundings of the synthetic quartz glass bodies G with SiO$_2$ powder 20, placing the vessel 10 with its lid 16 closed in the heating furnace, and applying the heat treatment in this state. The treatment may be performed in air. The temperature and the time of retention, the heating rate, the cooling rate, and other thermal treatment conditions may be those generally used in an ordinary heat treatment.

Figure 2A:
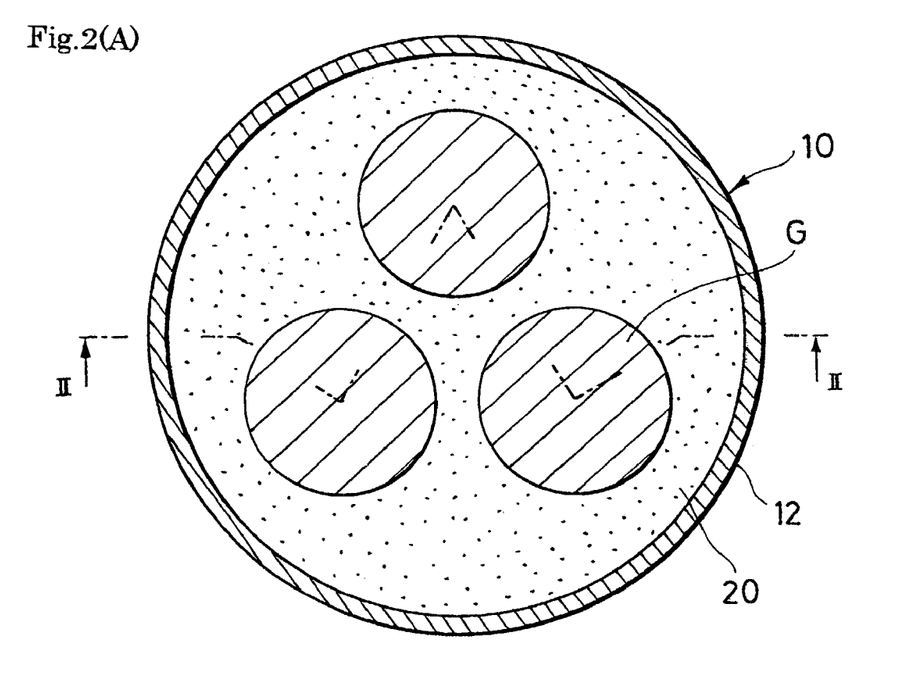
FIG. 2(A) shows the planar section view.
Figure 2B:
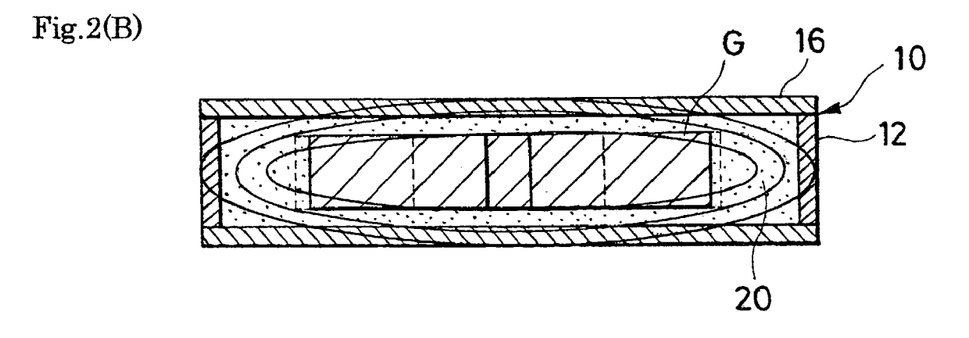
FIG. 2(B) shows the cross section view taken along line II—II of FIG. 2(A).

In accordance with the heat treatment method according to the present invention as described above during lowering the temperature, the temperature distribution within the objects of the treatment, i.e., the synthetic quartz glass bodies G, the SiO$_2$ powder 20, and the vessel 10 as a whole results as such shown in FIG. 2. Hence, the temperature gradient as viewed along the direction of the radius of the synthetic quartz glass body alone, i.e., the very object of the treatment, can be minimized. Accordingly, the fluctuation in the refractive index and the birefringence thereof as viewed along the direction of the radius of the synthetic quartz glass body can be minimized. Hence, in accordance with the present invention, there can be obtained a synthetic quartz glass for optical use having a fluctuation in refractive index Δn of $1.0 \times 10^6$ or less and a birefringence of 0.5 nm/cm or lower.

Further, the synthetic quartz glass for optical use according to the present invention preferably contains Na at a concentration of 10 ppb or less, and particularly preferably, 5 ppb or less. By reducing the Na content, the initial transmittance for a light 193.4 nm in wavelength can be improved, and it furthermore enables a synthetic quartz glass for optical use having an initial transmittance of 99.7% or higher.

Still further, the dissolved hydrogen molecule density of the synthetic quartz glass for optical use according to the present invention is preferably $2 \times 10^{17}$ molecules/cm$^3$ or higher, and more preferably, $5 \times 10^{17}$ molecules/cm$^3$ or higher.

EXAMPLES

An embodiment for practicing the present invention is described more specifically below by partially making reference to the drawings. However, it should be understood that the size, materials, shapes, relative arrangement, etc., that are described in the embodiment below are provided simply as examples or explanatory means, and are by no means limiting the present invention.

Figure 3:
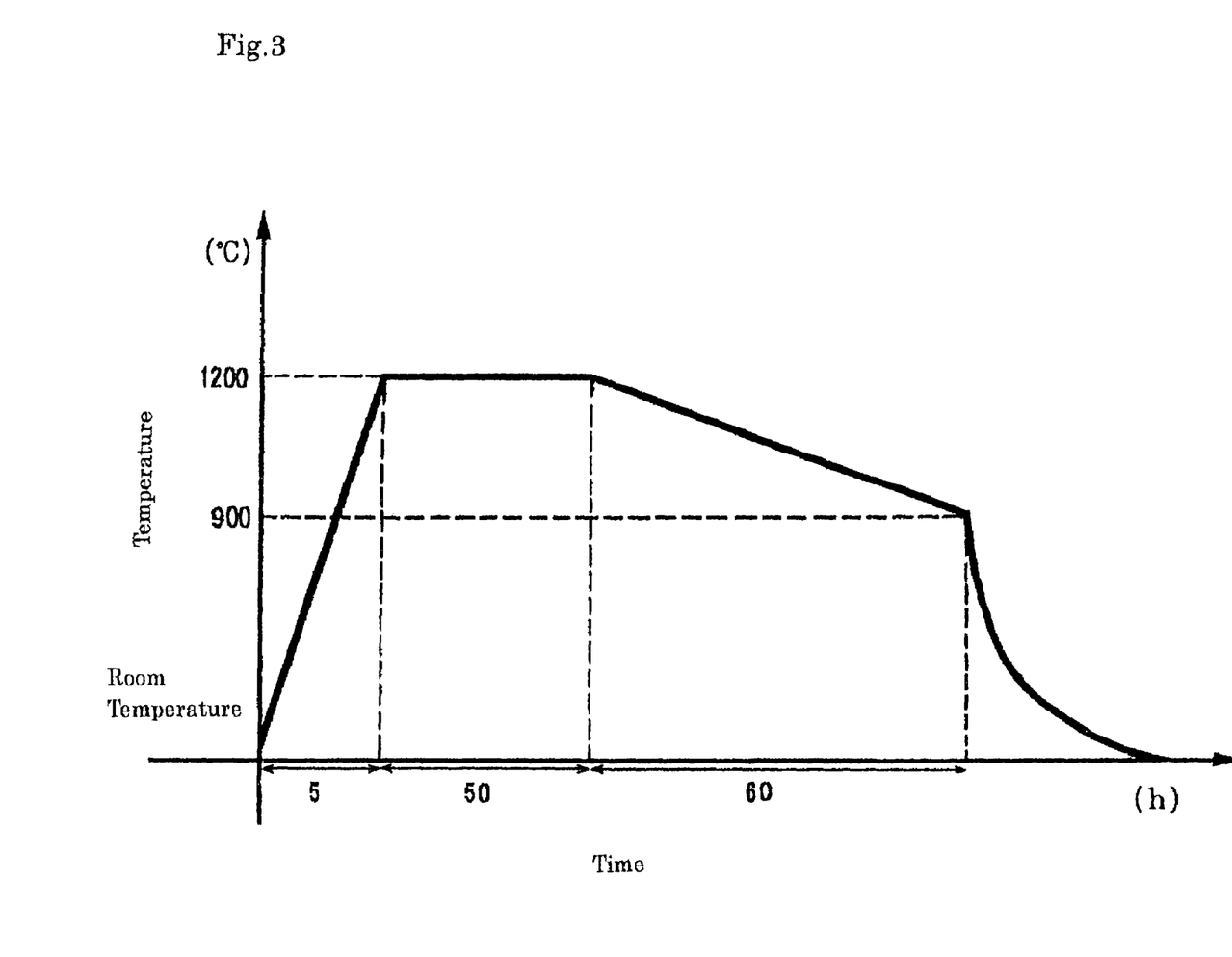
FIG. 3 is a diagram showing an example of a temperature profile used in a method for heat treating a synthetic quartz glass for optical use according to the present invention.

As a sample of a synthetic quartz glass for use as an optical member (sometimes referred to simply hereinafter as "sample"), which is the object of the treatment, three synthetic quartz glass bodies each 300 mm in diameter and 80 mm in thickness prepared by direct method were each used in Examples 1 and 2 and in Comparative Examples 1 and 2. For Example 3, two synthetic quartz glass bodies each 340 mm in diameter and 80 mm in thickness prepared similarly by direct method were used. The synthetic quartz glass bodies thus prepared each yielded a Na concentration of 5 ppb or lower and a hydrogen molecule (H$_2$) density of $1.8 \times 10^{18}$ molecules/cm$^3$. The synthetic quartz glass bodies above were each subjected to a heat treatment in air under a temperature profile shown in FIG. 3 in accordance with a method described below.

Example 1

A synthetic quartz glass vessel (which is sometimes simply referred to hereinafter as "vessel") having an outer diameter of 900 mm, an inner diameter of 800 mm, a height of 200 mm, a space with height of 100 mm, and a wall thickness of 50 mm, and a high purity synthetic quartz glass powder (which is sometimes simply referred to hereinafter as "powder") substantially free of hydrogen molecules and having a Na impurity concentration of 20 ppb, which consists of particles 53 to 710 μm in particle diameter, were prepared.

Then, the sample described hereinbefore was placed inside the above vessel in a state as shown in FIG. 1 while filling the powder described above, and they were set inside a heating furnace in this state to perform the heat treatment. The samples were placed inside the vessel by taking an interval of 50 mm (as measured between the side planes) at a position accounting for 78% of the vessel.

Example 2

A heat treatment was performed in the same manner as that described in Example 1, except for taking an interval of 120 mm between the samples and setting the samples at a position accounting for 87% of the vessel.

Example 3

A heat treatment was performed in the same manner as that described in Example 1, except for using, instead of the high purity synthetic quartz glass powder, a powder of a naturally occurring quartz (rock crystal), i.e., IOTA (trademark) powder consisting of particles 53 to 710 μm in particle diameter subjected to a purification treatment under a chlorine-containing atmosphere and thereby having a Na concentration of 50 ppb, and for using two samples each having a diameter of 340 mm set at a distance of 20 mm from each other.

Comparative Example 1

A heat treatment was performed in the same manner as that described in Example 1, except for placing the sample inside the same lidded vessel as that used in Example 1 but without using a synthetic quartz glass powder.

Comparative Example 2

A heat treatment was performed in the same manner as that described in Example 1, except for placing the sample as it is inside the heating furnace without using any powder or vessel.

Figure 4:
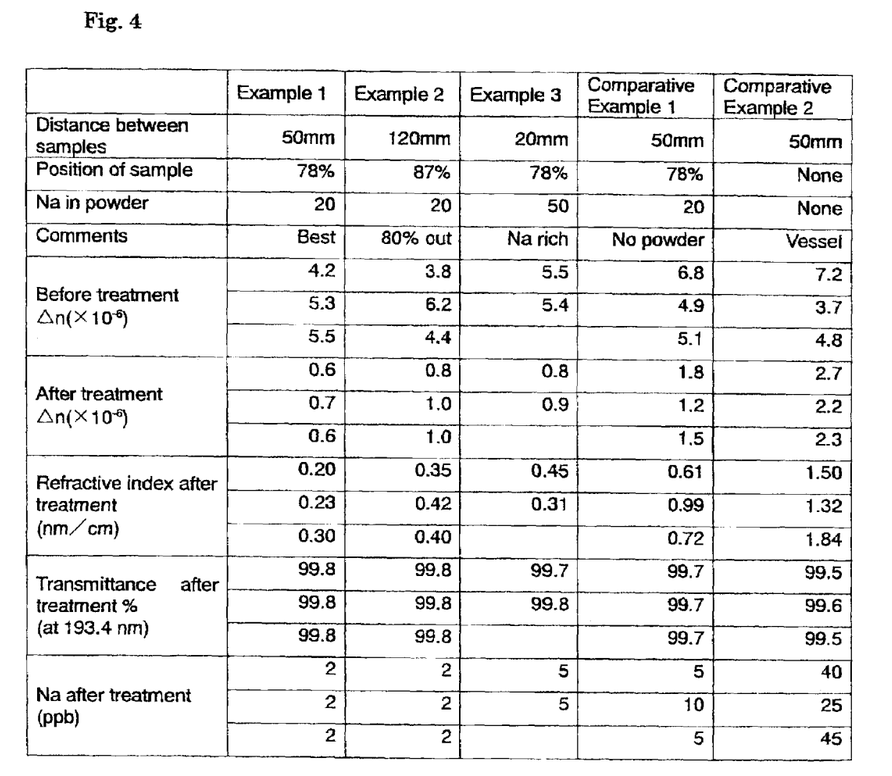
FIG. 4 is a table showing the physical properties and the like of the object before and after the heat treatment in accordance with the Examples and Comparative Examples of the present invention.

The interval between the samples, the sample position, and the Na content of the $SiO_2$ powder used for filling are summarized in the table given in FIG. 4.

The fluctuation in refractive index Δn before and after the heat treatment, birefringence after the treatment, the transmittance in percent for a radiation 193.4 nm in wavelength after the treatment, and the Na concentration after the treatment were measured on each of the synthetic quartz glass samples obtained as the object of the treatment in Examples and Comparative Examples above. The results are shown collectively in the table given in FIG. 4.

The table in FIG. 4 clearly reads that, for the three samples (synthetic quartz glass for optical use) treated in Example 1, the fluctuation in refractive index Δn decreases to 0.7 or lower after the heat treatment, that the birefringence is as low as 0.30 nm/cm, that the initial transmittance for a radiation 193.4 nm in wavelength is 99.8%, and that the Na concentration is 2 ppb. Thus, all of the samples exhibited sufficiently high homogeneity and ultraviolet transmitting properties for use as an optical member to be equipped in a lithographic apparatus.

In the synthetic quartz glass for optical use treated in accordance with Example 2, it reads that the fluctuation in refractive index Δn before and after the treatment is 1.0 or lower, that the birefringence is 0.42 nm/cm or lower, that the transmittance for a radiation 193.4 nm in wavelength is 99.8%, and that the Na concentration is 2 ppb. Thus, all of the samples exhibited sufficiently high homogeneity and ultraviolet transmitting properties for use as an optical member to be equipped in a lithographic apparatus, although they were slightly inferior to those obtained in Example 1 in terms of homogeneity.

In the synthetic quartz glass for optical use treated in accordance with Example 3, it reads that the fluctuation in refractive index Δn before and after the treatment is 0.9 or lower, that the birefringence is 0.45 nm/cm or lower, and that the transmittance for a radiation 193.4 nm in wavelength is 99.8% or 99.7%. Thus, all of the samples exhibited sufficiently high homogeneity and ultraviolet transmitting properties for use as an optical member to be equipped in a lithographic apparatus, although they were slightly inferior to those obtained in Example 1.

In contrast to above, in the treated samples of Comparative Example 1, the fluctuation in refractive index Δn before and after the heat treatment is found to be in a range of 1.2 to 1.8, the birefringence is in a range of 0.61 to 0.99 nm/cm, and the initial transmittance for a radiation 193.4 nm in wavelength for all the samples is found to be 99.7%. Thus, although slightly inferior to those obtained in Example 1, the samples exhibited sufficient ultraviolet transmitting properties for use as an optical member to be equipped in a lithographic apparatus, but problems were found thereon concerning homogeneity.

In the treated samples of Comparative Example 2, the fluctuation in refractive index Δn before and after the treatment is found to be in a range of 2.2 to 2.7, the birefringence is in a range of 1.32 to 1.84 nm/cm, and the initial transmittance for a radiation 193.4 nm in wavelength is found in a range of 99.5 to 99.6%. Thus, they had problems concerning both homogeneity and ultraviolet transmitting properties for use as an optical member to be equipped in a lithographic apparatus.

From the results above, the effect of the present invention can be clearly understood.

The methods for measuring the physical properties and the like as described in Examples and Comparative Examples are as follows.

1) Method for measuring the fluctuation in refractive index Δn: A measuring method according to optical interference method using a He—Ne laser (emitting radiation at a wavelength of 633 nm) as a light source was used. In the measurement above, the values are given for an area accounting for 90% of the sample diameter.
2) Method for measuring birefringence: A retardation measuring method using a polarizer strain meter was used. In the measurement above, the values are given for an area accounting for 90% of the sample diameter.
3) Method for measuring the transmittance for a radiation 193.4 nm in wavelength:
   A measurement method comprising obtaining an apparent transmittance T % for a sample thickness of 10 mm, and calculating the value in accordance with (T/90.68)×100, by using the value 90.68% obtained by subtracting the loss due to Rayleigh scattering 0.18% from the theoretical transmittance 90.86% of a quartz glass for a radiation 193.4 nm in wavelength.
4) Method for measuring Na impurity concentration: A method using flameless atomic absorption spectroscopy was used.
5) Method for measuring the particle diameter of the synthetic quartz glass powder: The powder was classified by using JIS standardized sieves having Nylon screens with apertures of 53 μm and 710 μm.

FIG. 1 is a diagram showing the main portion, i.e., the vessel and the $SiO_2$ powder given together with the object synthetic quartz glass body, of an apparatus for heat treating a synthetic quartz glass for optical use according to the present invention, wherein

FIG. 2 is a diagram showing the temperature distribution in the object synthetic quartz glass body during cooling inside an apparatus for heat treating a synthetic quartz glass for optical use according to the present invention, wherein

[Explanation of the Symbols]
10: Vessel
12: Surrounding side wall
14: Bottom plate
16: Lid
20: $SiO_2$ powder
G: Object synthetic quartz glass body The invention claim is:

1. A method for applying a heat treatment to a plurality of flat cylindrical synthetic quartz glass bodies for optical use in a heating furnace, said method comprising: preparing a vessel made of quartz glass and having a flat cylindrical space for setting therein the synthetic quartz glass bodies and a lid, placing the synthetic quartz glass bodies into the vessel in parallel with each other, filling the space with $SiO_2$ powder, setting the vessel inside the heating furnace with its lid closed, and applying the heat treatment to the vessel.

2. A method as claimed in claim 1, wherein, at least two of the object synthetic quartz glass bodies have equal diameters, the space being of a diameter that is 2.1 times or more of the diameters of the synthetic quartz glass bodies.

3. A method as claimed in claim 1, wherein the synthetic quartz glass bodies are positioned inside the vessel within 80% of the outer diameter of the vessel.

4. A method as claimed in claim 1, wherein said $SiO_2$ powder is a synthetic $SiO_2$ powder containing 30 ppb or less of Na.

5. A method as claimed in claim 1, wherein said $SiO_2$ powder has a hydrogen molecule density of $1.0\times10^{19}$ molecules/cm$^3$ or higher.

6. A method as claimed in claim 1, wherein said $SiO_2$ powder contains 95% by weight or more of particles having a particle diameter of 1,000 μm or smaller.

7. A method as claimed in claim 2, wherein the synthetic quartz glass bodies are positioned inside the vessel within 80% of the outer diameter of the vessel.

8. A method as claimed in claim 4, wherein said $SiO_2$ powder has a hydrogen molecule density of $1.0\times10^{19}$ molecules/cm$^3$ or higher.

9. A method as claimed in claim 4, wherein said $SiO_2$ powder contains 95% by weight or more of particles having a particle diameter of 1,000 μm or smaller.

10. A method as claimed in claim 5, wherein said $SiO_2$ powder contains 95% by weight or more of particles having a particle diameter of 1,000 μm or smaller.

11. A method as claimed in claim 8, wherein said $SiO_2$ powder contains 95% by weight or more of particles having a particle diameter of 1,000 μm or smaller.

* * * * *